United States Patent [19]
Eisen et al.

[11] Patent Number: 5,678,016
[45] Date of Patent: Oct. 14, 1997

[54] PROCESSOR AND METHOD FOR MANAGING EXECUTION OF AN INSTRUCTION WHICH DETERMINE SUBSEQUENT TO DISPATCH IF AN INSTRUCTION IS SUBJECT TO SERIALIZATION

[75] Inventors: Lee E. Eisen, Austin; Robert T. Golla, Plano; Christopher H. Olson; Michael Putrino, both of Austin, all of Tex.

[73] Assignee: International Business Machines Corporation, Armonk, N.Y.

[21] Appl. No.: 512,741

[22] Filed: Aug. 8, 1995

[51] Int. Cl.⁶ .................................................... G06F 9/38
[52] U.S. Cl. .................. 395/392; 395/391; 395/395; 395/563; 364/748
[58] Field of Search ............................. 395/375, 500, 395/800, 391, 392, 563, 395; 364/748

[56] References Cited

U.S. PATENT DOCUMENTS

| | | | |
|---|---|---|---|
| 3,593,312 | 7/1971 | Barton et al. | 395/775 |
| 4,458,311 | 7/1984 | Clements et al. | 395/144 |
| 4,476,537 | 10/1984 | Blau et al. | 364/748 |
| 4,484,301 | 11/1984 | Borgerding et al. | 364/760 |
| 4,722,068 | 1/1988 | Kuroda et al. | 364/757 |
| 4,785,412 | 11/1988 | Tran | 364/761 |
| 4,809,212 | 2/1989 | New et al. | 364/757 |
| 4,860,240 | 8/1989 | Hartley et al. | 364/757 |
| 4,893,268 | 1/1990 | Denman, Jr. et al. | 364/759 |
| 5,133,077 | 7/1992 | Karne et al. | 395/800 |
| 5,235,533 | 8/1993 | Sweedler | 364/715.03 |
| 5,268,855 | 12/1993 | Mason et al. | 364/748 |
| 5,317,526 | 5/1994 | Urano et al. | 364/715.03 |
| 5,465,373 | 11/1995 | Kahle et al. | 395/391 |
| 5,479,622 | 12/1995 | Grohoski et al. | 395/391 |
| 5,553,256 | 9/1996 | Fetterman et al. | 395/393 |

*Primary Examiner*—Kenneth S. Kim
*Attorney, Agent, or Firm*—Michael A. Davis; Brian F. Russell; Andrew J. Dillon

[57] ABSTRACT

A method and apparatus are disclosed for managing the execution of a floating-point store instruction within a data processing system including a memory and a superscalar processor having a number of floating-point registers (FPRs). According to the present invention, multiple instructions are dispatched for execution by the processor, including a floating-point store instruction having as an operand the content of a particular FPR. A determination is made whether the particular FPR is a destination register for results of a second instruction which precedes the store instruction in program order. If so, a determination is made whether the second instruction must complete before subsequent instructions can be successfully dispatched. In response to a determination that the second instruction must be completed prior to successfully dispatching subsequent instructions, the floating-point instruction is cancelled and redispatched after the completion of the second instruction. In response to a determination that the second instruction need not be completed prior to successfully dispatching subsequent instructions, execution of the floating-point store instruction is initiated by computing the destination address within memory into which the operand of the floating-point store instruction is to be stored, thereby minimizing the delay in executing a floating-point store instruction.

17 Claims, 3 Drawing Sheets

PROCESSOR AND METHOD FOR MANAGING EXECUTION OF AN INSTRUCTION WHICH DETERMINE SUBSEQUENT TO DISPATCH IF AN INSTRUCTION IS SUBJECT TO SERIALIZATION

BACKGROUND OF THE INVENTION

1. Technical Field

The present invention relates in general to a method and system for data processing and in particular to a method and system for managing instruction flow within a data processing system. Still more particularly, the present invention relates to a method and system for managing execution of a floating-point store instruction by a superscalar processor.

2. Description of the Related Art

A typical superscalar processor includes multiple execution units which enable the superscalar processor to dispatch and execute multiple instructions during each processor cycle. Typically, superscalar processors include floating-point registers (FPRs) in hardware which store operand and result data for floating-point instructions executed by the processor. Some superscalar processors include valid bits associated with each of the FPRs which indicate whether the data contained within an FPR is valid. For example, certain processors within the PowerPC™ line of microprocessors available from IBM Microelectronics include valid bits associated with each FPR that indicate whether integer or floating-point data is stored within the associated single-precision FPR or in an emulated double-precision FPR residing in memory.

The valid bits associated with a FPR are set when either a load/store unit (LSU) or a floating-point unit (FPU) within the processor completes a floating-point instruction having the FPR as a target register. Since multiple instructions can be dispatched each cycle, a problem arises when a floating-point store instruction is dispatched for execution by the LSU while a floating-point instruction which precedes the store instruction in program order remains outstanding. Because the outstanding floating-point instruction can alter the state of the valid bits associated with the FPR that is the source register for the store instruction, the store instruction waits for the outstanding floating-point instruction to complete prior to the execution of the floating-point store instruction in order to ensure that the correct data is stored to memory. Thus, it is apparent that conventional superscalar processors having valid bits associated with FPRs provide less than optimum performance due to the delay required to ascertain the state of the valid bits before a floating-point store instruction can be completed.

Consequently, it would be desirable to provide an improved method and system for managing the execution of a floating-point store instruction within a superscalar processor which minimize the delay in executing the floating-point store instruction.

SUMMARY OF THE INVENTION

It is therefore one object of the present invention to provide an improved method and system for data processing.

It is another object of the present invention to provide an improved method and system for managing instruction flow within a data processing system.

It is yet another object of the present invention to provide an improved method and system for managing the execution of a floating-point store instruction within a superscalar processor.

The foregoing objects are achieved as is now described. A method and apparatus are disclosed for managing the execution of a floating-point store instruction within a data processing system including a memory and a superscalar processor having a number of floating-point registers (FPRs). According to the present invention, multiple instructions are dispatched for execution by the processor, including a floating-point store instruction having as an operand the content of a particular FPR. A determination is made whether the particular FPR is a destination register for results of a second instruction which precedes the store instruction in program order. If so, a determination is made whether the second instruction must complete before subsequent instructions can be successfully dispatched. In response to a determination that the second instruction must be completed prior to successfully dispatching subsequent instructions, the floating-point instruction is cancelled and redispatched after the completion of the second instruction. In response to a determination that the second instruction need not be completed prior to successfully dispatching subsequent instructions, execution of the floating-point store instruction is initiated by computing the destination address within memory into which the operand of the floating-point store instruction is to be stored, thereby minimizing the delay in executing a floating-point store instruction.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
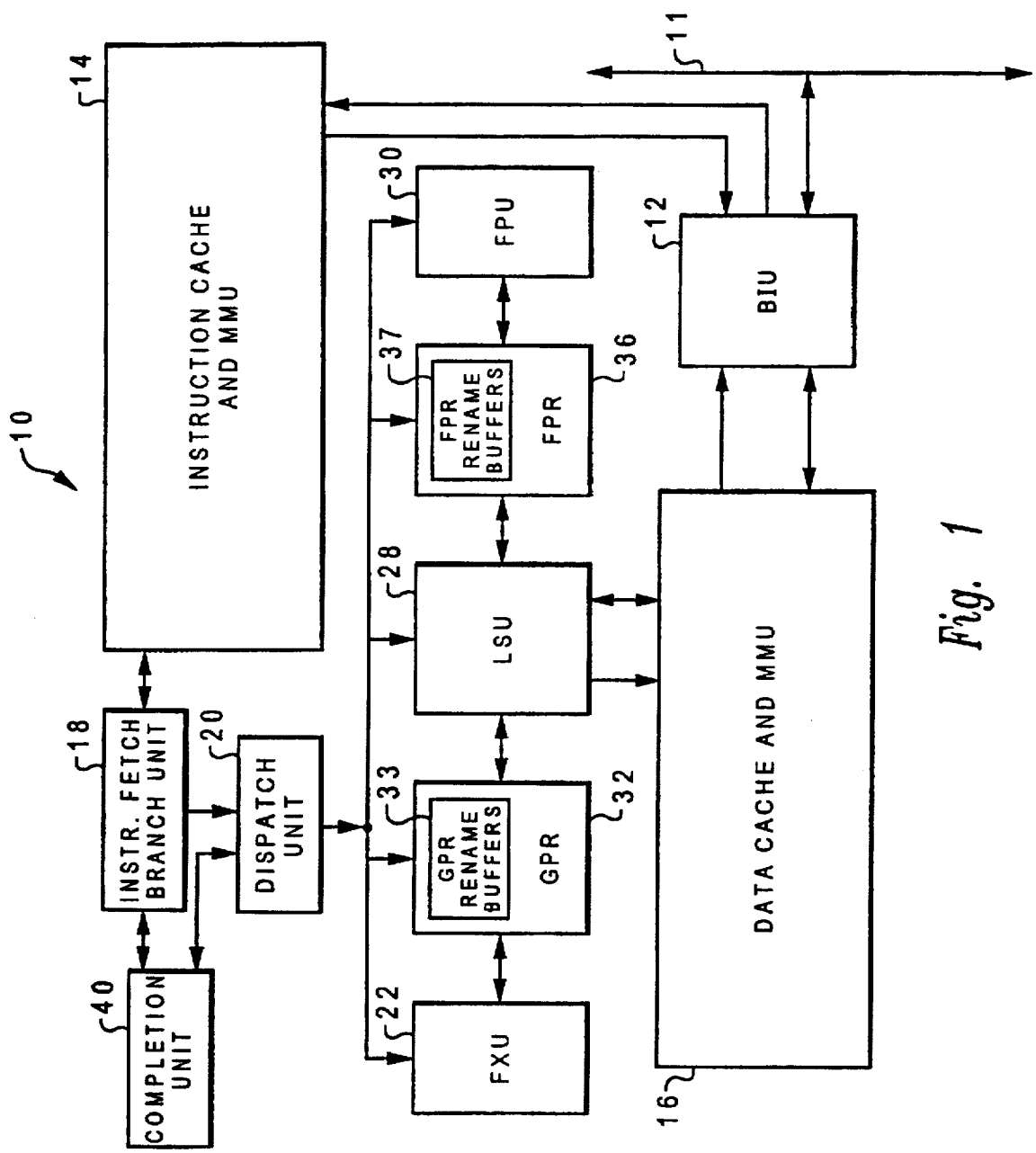
FIG. 1 illustrates a block diagram of a superscalar processor according to a preferred embodiment of the present invention.

With reference now to the figures and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor. Accordingly, as discussed further below, processor 10 included various execution units, registers, buffers, memories, and other functional units, which are all formed by integrated circuitry. In a preferred embodiment of the present invention, processor 10 comprises one of the PowerPC™ line of microprocessors, which operates according to reduced instruction set computing (RISC) techniques. As depicted in FIG. 1, processor 10 is coupled to system bus 11 via a bus interface unit (BIU) 12 within processor 10. BIU 12 controls the transfer of information between processor 10 and other devices within a host data processing system that are coupled to system bus 11, such as a main memory (not illustrated).

BIU 12 is connected to instruction cache 14 and data cache 16 within processor 10. High speed caches, such as instruction cache 14 and data cache 16 enable processor 10 to achieve relatively fast access time to a subset of data or instructions previously transferred from main memory to caches 14 and 16, thus improving the speed of operation of the host data processing system. In response to signals from instruction fetch/branch unit 18, instruction cache 14 transmits instructions to instruction fetch/branch unit 18, which in turn selectively transmits instructions to other execution circuitry within processor 10.

In the depicted embodiment, in addition to instruction fetch/branch unit 18, the execution circuitry of processor 10 includes multiple execution units, including fixed-point unit (FXU) 22, load/store unit (LSU) 28, and floating-point unit (FPU) 30. FXU 22 and LSU 28 receive source operands from general purpose registers (GPRs) 32. FXU 22 and LSU 28 output results of instructions to GPR rename buffers 33, which provide temporary storage for result data until the instructions are completed by transferring the result data from GPR rename buffers 33 to one or more of GPRs 32. In addition, LSU 28 and FPU 30 receive source operands from floating-point registers (FPRs) 36. LSU 28 and FPU 30 output data resulting from the execution of floating-point instructions to selected FPR rename buffers 37, which temporarily store the data until the instructions are completed by transferring the result data from FPR rename buffers 37 to selected FPRs 36.

During each processor cycle, instructions are loaded from instruction cache 14 into instruction fetch/branch unit 18, which selectively dispatches the instructions through dispatch unit 20 to the appropriate execution unit among FXU 22, LSU 28, and FPU 30. As is well-known to those skilled in the computer arts, each execution unit executes one or more instructions of a particular class of instructions during each processor cycle. For example, FXU 22 executes fixed-point mathematical operations on source operands, such as addition, subtraction, ANDing, ORing, and XORing. Conversely, FPU 30 executes floating-point operations on source operands, such as floating-point multiplication and division operations. As its name implies, LSU 28 executes floating-point and fixed-point instructions which either load data from memory (i.e., either data cache 16 or main memory) into selected GPRs 32 or FPRs 36 or which store data from a selected GPRs 32 or FPRs 36 to memory.

In addition to its superscalar architecture, processor 10 employs both pipelining and out-of-order execution of instructions to achieve high performance. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. Typically, an instruction is processed at five distinct stages, namely, fetch, decode/dispatch, execute, finish, and completion.

At the fetch stage, instruction fetch/branch unit 18 receives one or more instructions associated with one or more memory addresses from instruction cache 14. Then, during the decode/dispatch stage, dispatch unit 20 decodes and dispatches several instructions to the appropriate ones of execution units 22, 28, and 30. Also during the decode/dispatch stage, dispatch unit 20 reserves a rename buffer within GPR rename buffers 33 or FPR rename buffers 37 for each dispatched instruction's result data. According to a preferred embodiment of the present invention, processor 10 dispatches instructions in program order and tracks the program order of the dispatched instructions during out-of-order execution by means of a unique instruction identifier.

During the execute stage, execution units 22, 28, and 30, execute instructions received from dispatch unit 20 as soon as the source operands for the indicated operations are available. After execution has terminated, execution units 22, 28, and 30 store data results within either GPR rename buffers 33 or FPR rename buffers 37, depending upon the instruction type. Then, execution units 22, 28, and 30 signal completion unit 40 that the execution unit has finished an instruction. Finally, instructions are completed according to program order by transferring result data from GPR rename buffers 33 or FPR rename buffers 37 to GPRs 32 or FPRs 36, respectively.

According to the present invention, FPU 30 supports only single-precision floating-point operations. However, processor 10 support double-precision and integer floating-point operations by executing emulation routines stored within memory. Accordingly, a portion of the address space addressable by processor 10 is reserved for emulation routines corresponding to double-precision and integer floating-point instructions within the instructions set of processor 10. Furthermore, as described below in greater detail with reference to FIG. 2, the address space of processor 10 includes emulated double-precision FPRs since FPRs 36 comprises an array of single-precision hardware FPRs.

Figure 2:
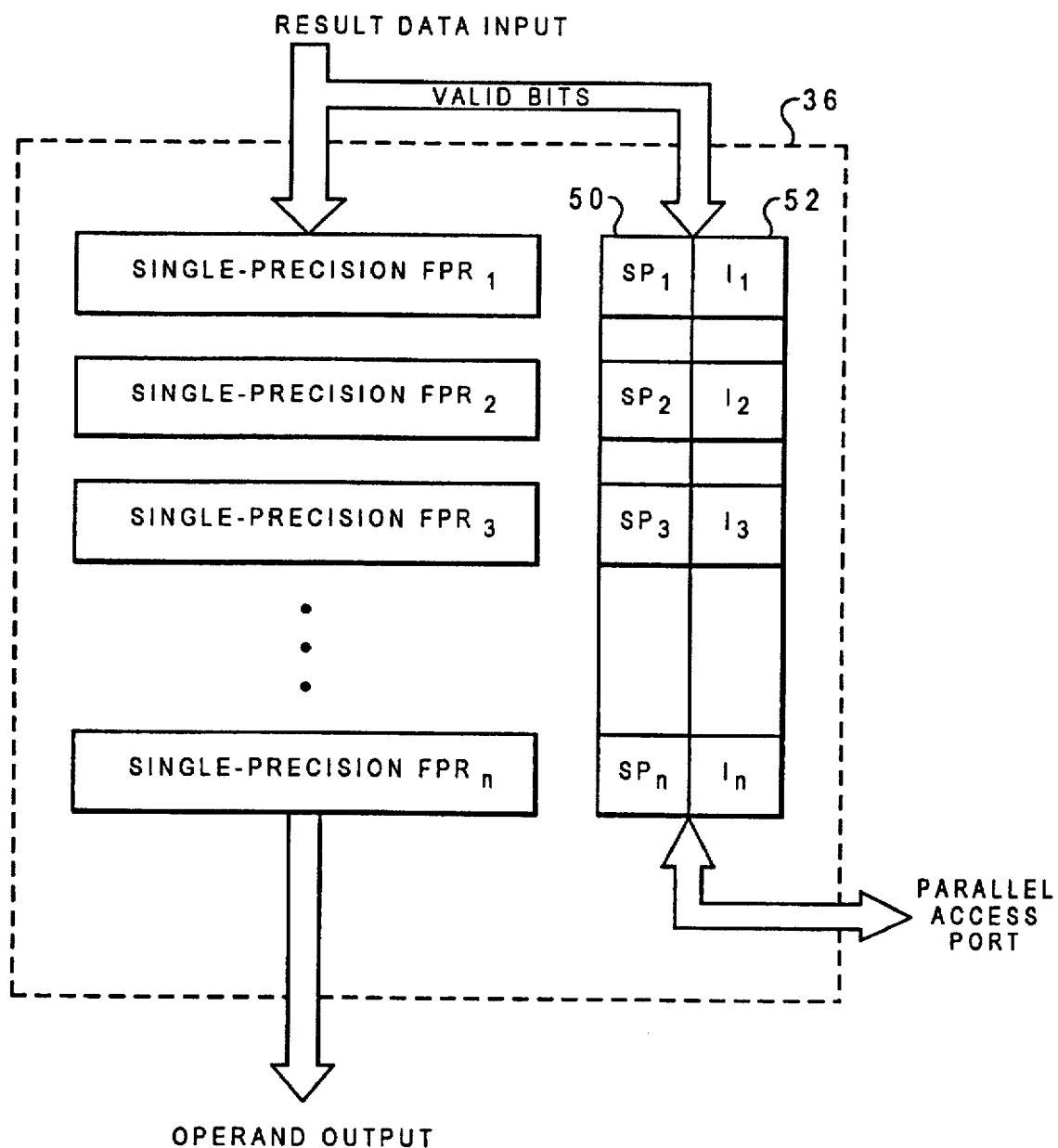
FIG. 2 depicts a single-precision floating-point register array according to a preferred embodiment of the present invention.

Referring now to FIG. 2, there is depicted a more detailed block diagram of FPRs 36. As illustrated, FPRs 36 includes N single-precision floating-point registers which store either a single-precision floating-point operand or an integer value. Single-precision floating-point operands are received by FPRs 36 from FPU 30 and LSU 28 through input ports generally indicated in FIG. 2 by the designation "Result Data Input." Operand output from FPRs 36 to FPU 30 and LSU 28 is indicated generally in FIG. 2 by the designation "Operand Output."

FPRs 36 also includes two n-bit special purpose registers (SPRs) 50 and 52. Each bit of SPR 50 and 52 is associated with one of the n FPRs within FPRs 36. The two valid bits (one from each of SPR 50 and SPR 52) associated with each single-precision FPR are mutually exclusive valid bits which indicate whether single-precision floating-point or integer data resides in the associated FPR. Thus, if the SP (single-precision) bit within SPR 50 is set, the associated FPR contains single-precision floating-point data. If the I (integer) bit within SPR 52 is set, the associated FPR contains integer data.

If neither the SP or I bit associated with a FPR is set, the data contained within the hardware FPR is invalid and valid data resides within an emulated double-precision FPR in memory that is mapped to the hardware single-precision FPR. When a FPR for which the SP and I bits are off is the source register for a floating-point operation, the operand data for the operation is retrieved from the emulated double-precision FPR, and the operation is performed by executing an emulation routine stored within memory.

The SP and I bits associated with a FPR are set as data is input into FPRs 36 through the Result Data Input. The state of the valid bits associated with each of the FPRs can be accessed and reloaded simultaneously, in parallel, utilizing floating-point special purpose instructions, such as a "move from special purpose register" (mfspr) instruction and a "move to special purpose register" (mtspr) instruction. These instructions, and others which access SPRs 50 and 52 read and write the values of SPRs 50 and 52 through the Parallel Access Port. Because the execution of floating-point instructions can change the state of the valid bits associated with a FPR, instructions which directly access SPRs 50 and 52 are serialized, that is, instructions which store data to SPRs 50 and 52 via the parallel access port must complete before any instructions subsequent to the serialized instruction can be dispatched. Serializing instructions which store data to SPRs 50 and 52 insures that a sequential instruction following the instruction that stores data to one of SPRs 50 and 52 does not execute out-of-order, thereby causing the stores to SPRs 50 and 52 to load an erroneous SPR value.

Figure 3:
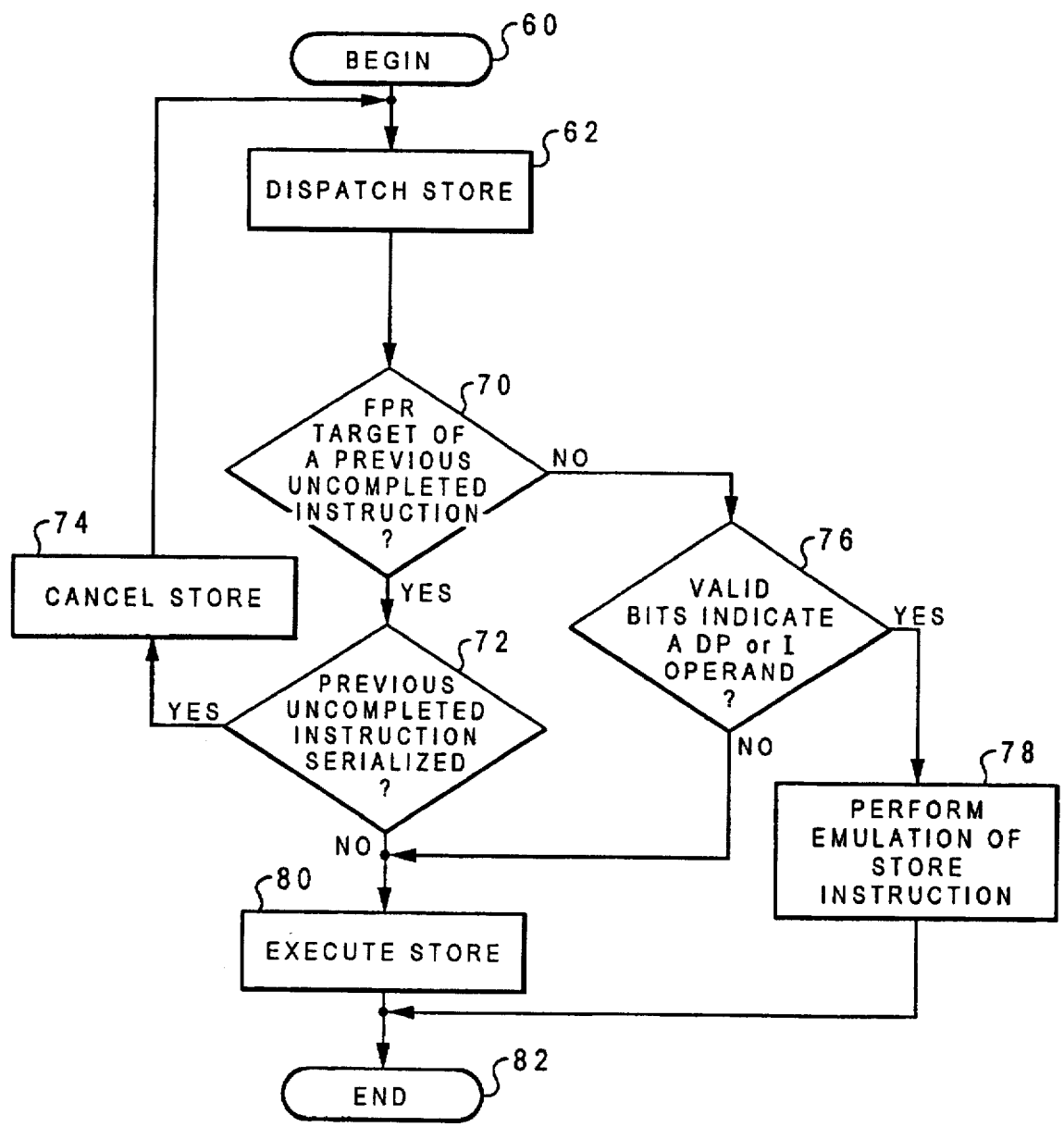
FIG. 3 is a flowchart illustrating the method for managing the execution of a floating-point store instruction according to the present invention.

As described above, prior art processors require that execution of all instructions which have the target FPR of an outstanding previous instruction as a source operand be delayed until the previous instruction completes, thereby insuring that the valid bits associated with the FPR do not change during the execution of the subsequent instruction. With reference now to FIG. 3, there is illustrated a flowchart of the method utilized by the present invention to eliminate the delay in executing a floating-point store instruction which has as its operand the target of an outstanding previous floating-point instruction in cases where the previous floating-point instruction is not serialized.

As illustrated, the process begins at block 60 and thereafter proceeds to block 62, which illustrates dispatching a floating-point store instruction to LSU 28 for execution. The store instruction includes an operand field which specifies which of FPRs 36 is the source operand of the floating-point store instruction. The process proceeds from block 62 to block 70, where a determination is made whether the source FPR specified within the floating-point store instruction is the target of a previously dispatched, but uncompleted (outstanding) instruction. As described above, processor 10 enables multiple instructions to be dispatched and executed during each processor cycle. However, instructions issued to FXU 22, LSU 28, and FPU 30 are completed in program order. LSU 28 is provided with a set of signals from dispatch unit 20 (which is in turn coupled to completion unit 40) that indicate whether or not the source FPR of the floating-point store instruction is the target of an outstanding floating-point instruction.

If at block 70 a determination is made that the source FPR of the floating-point store instruction is the target of an uncompleted instruction which precedes the floating-point store instruction in program order, the process proceeds to block 72, which depicts making a determination of whether the previous outstanding instruction is serialized. In a preferred embodiment of the present invention in which processor 10 comprises one of the PowerPC™ microprocessors, only three instructions that relate to FPRs 36 are serialized by processor 10: floating-point convert to integer (fctiwz), move floating-point status and control register to FPR (mffs), and the move to special purpose register (mtspr) instructions. For more information about the PowerPC™ instruction set, see the publication entitled *PowerPC™ User Instruction Set Architecture* available from IBM Microelectronics. In response to a determination that the previous outstanding instruction is serialized, the process proceeds to block 74, which illustrates cancelling the floating-point store instruction. The process then returns to block 62, which depicts instruction dispatch unit 20 redispatching the floating-point store instruction upon the completion of the outstanding serialized instruction.

Returning to block 70, if the source FPR of the floating-point store instruction is not the target of an outstanding instruction which precedes the store instruction in program order, the process proceeds to block 76, which depicts making a determination of whether the valid bits associated with the source FPR indicate that the operand of the floating-point store instruction is a double-precision or integer value. If the valid bits indicate that the operand is a double-precision or integer value (i.e., the valid bits are set to 00 or 01), the process proceeds to block 78, which depicts executing the floating-point store instruction by executing an emulation routine which stores the data contained within the source hardware FPR or the emulated double-precision FPR mapped to the source hardware FPR into the effective address within memory. Thereafter, the process proceeds to block 82 where it terminates.

Returning to blocks 72 and 76, in response to a negative answer at either of blocks 72 or 76, the process proceeds to block 80, which illustrates executing the floating-point store instruction. The process follows the path between blocks 76 and 80 when the source FPR contains a single-precision floating-point value. The process follows the path between blocks 72 and 80 when the preceding instruction which utilizes the store instruction's source FPR as a target is a single-precision floating-point instruction. In either case, execution of the floating-point store instruction is initiated by calculating the effective address within memory into which the operand of the floating-point store instruction is to be stored. Once the effective address has been calculated, the floating-point store instruction is finished by enqueing the store operation in a memory queue. After the completion of the outstanding previous instruction, if any, which utilizes the source FPR of the floating-point store instruction as a target, the floating-point store instruction is completed by storing the source operand contained within the FPR into the effective address in memory. Thereafter, the process proceeds from block 80 to block 82 where the process terminates.

As has been described, the present invention provides an improved method and system for managing the execution of a floating-point store instruction within a superscalar processor. By assuming that the content of a source FPR is a valid single-precision floating-point value, and by cancelling the floating-point store instruction if the assumption proves incorrect, the present invention enables floating-point store instructions to be dispatched without waiting for previous instructions which utilize the source FPR as a target to complete. Consequently, overall processor efficiency is enhanced since cancellation of floating-point store instructions is performed in only a limited number of cases in which an outstanding serialized instruction utilizes the FPR which contains the store instruction's source operand as a target.

While the invention has been particularly shown and described with reference to a preferred embodiment, it will be understood by those skilled in the art that various changes in form and detail may be made therein without departing from the spirit and scope of the invention.

What is claimed is:

1. A method within a processor for managing the execution of an instruction, said processor having a plurality of bit sets for containing various data including at least one operand, said method comprising:

dispatching a plurality of instructions for execution by said processor, wherein said plurality of instructions includes a first instruction having as an operand at least one bit within a particular bit set among said plurality of bit sets;

thereafter, determining whether said particular bit set is a destination for data results of a second instruction among said plurality of instructions which precedes said first instruction in a program order;

in response to a determination that said particular bit set is a destination for data results of said second instruction, determining whether dispatch of instructions subsequent to said second instruction in said program order is subject to completion of said second instruction;

in response to a determination that dispatch of instructions subsequent to said second instruction is subject to completion of said second instruction, cancelling said first instruction; and in response to a determination that dispatch of instructions subsequent to said second instruction is not subject to completion of said second instruction, initiating execution of said first instruction regardless of whether or not said particular bit set is a destination for data results of said second instruction.

2. The method of claim 1, said method further comprising:

in response to a determination that said particular bit set is not a destination for data results of said second instruction, performing an operation indicated by said first instruction.

3. The method of claim 1, said method further comprising:

subsequent to said step of cancelling said first instruction, redispatching said first instruction in response to completion of said second instruction.

4. A processor, comprising:

at least one execution unit;

a plurality of bit sets for containing various data including at least one operand;

means for dispatching a plurality of instructions for execution by said at least one execution unit, wherein said plurality of instructions includes a first instruction having as an operand at least one bit within a particular bit set among said plurality of bit sets;

means for thereafter determining whether said particular bit set is a destination for data results of a second instruction among said plurality of instructions which precedes said first instruction in said program order;

means, responsive to a determination that said particular bit set is a destination for data results of said second instruction, for determining whether dispatch of instructions subsequent to said second instruction in said program order is subject to completion of said second instruction;

means for cancelling said first instruction in response to a determination that dispatch of instructions subsequent to said second instruction is subject to completion of said second instruction; and means, responsive to a determination that dispatch of instructions subsequent to said second instruction is not subject to completion of said second instruction, for initiating execution of said first instruction regardless of whether or not said particular bit set is a destination for data results of said second instruction.

5. The processor of claim 4, said processor further comprising:

means for performing an operation indicated by said first instruction in response to a determination that said particular bit set is not a destination for data results of said second instruction.

6. The processor of claim 4, and further comprising:

means for redispatching said first instruction subsequent to cancellation of said first instruction in response to completion of said second instruction.

7. The method of claim 2, wherein said first instruction comprises a store instruction.

8. The method of claim 7, wherein said step of initiating execution of said first instruction comprises calculating a destination address within a memory into which said operand is to be stored.

9. The method of claim 7, wherein said store instruction is a floating-point store instruction.

10. The method of claim 9, wherein said processor performs single-precision floating-point store operations utilizing a load/store execution unit and double-precision and integer operations by emulation, wherein said step of performing an operation indicated by said first instruction comprises:

determining whether performing said floating-point store instruction entails performing a double-precision or integer operation;

in response to a determination that performing said floating-point store instruction does not entail performing a double-precision or integer operation, executing said floating-point store instruction utilizing said load/store execution unit; and in response to a determination that performing said floating-point store instruction entails performing a double-precision or integer operation, executing an emulation routine to perform said double-precision or integer operation.

11. The method of claim 10, wherein said particular bit set includes at least one valid bit and a register, wherein said step of determining whether performing said floating-point store instruction entails performing a double-precision or integer operation comprises determining whether said at least one valid bit within said particular bit set is set.

12. The processor of claim 5, wherein said first instruction comprises a store instruction.

13. The processor of claim 12, said processor having an associated memory, wherein said means for initiating execution of said first instruction comprises means for calculating a destination address within said memory into which said operand is to be stored.

14. The processor of claim 12, wherein said store instruction is a floating-point store instruction.

15. The processor of claim 14, wherein said processor performs single-precision floating-point store operations utilizing a load/store execution unit and double-precision and integer operations by emulation, wherein said means for performing an operation indicated by said first instruction comprises:

means for determining whether performing said floating-point store instruction entails performing a double-precision or integer operation;

means for executing said floating-point store instruction utilizing said load/store execution unit in response to a determination that performing said floating-point store instruction does not entail performing a double-precision or integer operation; and means, responsive to a determination that performing said floating-point store instruction entails performing a double-precision or integer operation, for executing an emulation routine to perform said double-precision or integer operation indicated by said first instruction.

16. The processor of claim 15, said particular bit set includes at least one valid bit and a register, wherein said means for determining whether performing said floating-point store instruction entails performing a double-precision or integer operation comprises means for determining whether said at least one valid bit within said particular bit set is set.

17. The processor of claim 4, wherein said particular bit set includes a register and at least one associated valid bit.

* * * * *